(12) United States Patent
Salter et al.

(10) Patent No.: US 9,399,427 B2
(45) Date of Patent: Jul. 26, 2016

(54) PHOTOLUMINESCENT DEVICE HOLDER

(71) Applicant: Ford Global Technologies, LLC, Dearborn, MI (US)

(72) Inventors: Stuart C. Salter, Whitelake, MI (US); Scott Holmes Dunham, Redford, MI (US); Cornel Lewis Gardner, Romulus, MI (US); Annette Lynn Huebner, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 141 days.

(21) Appl. No.: 14/502,138

(22) Filed: Sep. 30, 2014

(65) Prior Publication Data

US 2015/0197190 A1   Jul. 16, 2015

Related U.S. Application Data

(63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
  *B60Q 1/00* (2006.01)
  *B60Q 1/26* (2006.01)
  *B60Q 3/02* (2006.01)
  *B60Q 3/04* (2006.01)

(52) U.S. Cl.
  CPC .............. *B60Q 3/022* (2013.01); *B60Q 3/0283* (2013.01); *B60Q 3/044* (2013.01)

(58) Field of Classification Search
  CPC ...... B60Q 3/022; B60Q 3/0243; B60Q 3/0283
  USPC .................................. 362/487–488, 509–510
  See application file for complete search history.

(56) References Cited

U.S. PATENT DOCUMENTS

| | | | |
|---|---|---|---|
| 5,709,453 | A | 1/1998 | Krent et al. |
| 6,419,379 | B1 | 7/2002 | Hulse |
| 6,729,738 | B2 | 5/2004 | Fuwausa et al. |
| 6,773,129 | B2 | 8/2004 | Anderson, Jr. et al. |
| 6,851,840 | B2 | 2/2005 | Ramamurthy et al. |
| 6,871,986 | B2 | 3/2005 | Yamanaka et al. |
| 6,990,922 | B2 | 1/2006 | Ichikawa et al. |
| 7,213,923 | B2 | 5/2007 | Liu et al. |
| 7,264,366 | B2 | 9/2007 | Hulse |
| 7,264,367 | B2 | 9/2007 | Hulse |
| 7,287,885 | B2 | 10/2007 | Radu et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Vichit Chea; Price Heneveld LLP

(57) ABSTRACT

An illuminated device storage apparatus for a vehicle is disclosed. The storage apparatus comprises a console forming an elongated opening leading to a cavity. At least one support member extends along the elongated opening and is configured to engage a device. The storage apparatus further comprises a light source disposed proximate the cavity and configured to emit a first emission of light upward to illuminate the at least one support member.

13 Claims, 5 Drawing Sheets

(56) References Cited

U.S. PATENT DOCUMENTS

| | | |
|---|---|---|
| 7,441,914 B2 | 10/2008 | Palmer et al. |
| 7,708,436 B2 | 5/2010 | Lota |
| 7,745,818 B2 | 6/2010 | Sofue et al. |
| 7,753,541 B2 | 7/2010 | Chen et al. |
| 7,798,548 B2 | 9/2010 | Embach et al. |
| 7,810,969 B2 | 10/2010 | Blackmore et al. |
| 7,834,548 B2 | 11/2010 | Jousse et al. |
| 7,862,220 B2 | 1/2011 | Cannon et al. |
| RE42,340 E | 5/2011 | Anderson et al. |
| 7,987,030 B2 | 7/2011 | Flores et al. |
| 8,016,465 B2 | 9/2011 | Egerer et al. |
| 8,071,988 B2 | 12/2011 | Lee et al. |
| 8,162,520 B2 | 4/2012 | Penner |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,616,605 B2 | 12/2013 | Hipshier et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0177397 A1 | 8/2007 | Sakakibara et al. |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2010/0270928 A1 | 10/2010 | Dixon |
| 2012/0001406 A1 | 1/2012 | Paxton et al. |
| 2012/0280528 A1 | 11/2012 | Dellock et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| DE | 102006035507 B4 | 4/2013 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 | though.

PHOTOLUMINESCENT DEVICE HOLDER

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to a vehicle lighting apparatus, and more particularly, to a vehicle lighting apparatus employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illuminated device storage apparatus is disclosed. The storage apparatus comprises a console forming an elongated opening leading to a cavity. At least one support member extends along the elongated opening and is configured to engage a device. The storage apparatus further comprises a light source disposed proximate the cavity and configured to emit a first emission of light upward to illuminate the at least one support member.

According to another aspect of the present invention, a photoluminescent device storage apparatus is disclosed. The storage apparatus comprises a console having an elongated opening forming a cavity. A pair of support members forming a first photoluminescent portion extend along opposing sides of the elongated opening and are configured to engage a device. The storage apparatus further comprises a light source disposed proximate the cavity and configured to emit a first emission of light upward to illuminate the photoluminescent portion in a second emission.

According to yet another aspect of the present invention, a photoluminescent storage apparatus comprising a console having an upper portion and a lower portion is disclosed. The upper portion is operable to rotate from a first position to a second position. A light source is disposed proximate the lower portion and is configured to emit a first emission of light. The storage apparatus further comprises a first photoluminescent portion and a second photoluminescent portion disposed proximate the console, wherein first emission is directed to the first photoluminescent portion in the first position and the second photoluminescent in the second position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting apparatus for a vehicle configured to illuminate at least a portion of a console. In some implementations, a light source may be utilized to illuminate a device holder that is accessible in a passenger compartment of the vehicle. The light source may be also be utilized to illuminate an interior cavity of the storage bin in a second position. The interior cavity may correspond to a storage bin disposed in the console. The light source may be configured to emit light at a first wavelength or excitation emission to excite a photoluminescent structure.

The photoluminescent structure may be configured to convert the first wavelength of the light or the excitation emission into a second wavelength or second emission. The first wavelength of the light may correspond to a first color of light and the second wavelength may correspond to a second color of light, different from the first color. While the various implementations of the lighting apparatus described herein refer to specific structures demonstrated in reference to at least one automotive vehicle, it will be appreciated that the disclosed console and lighting apparatus may be utilized in a variety of applications.

Figure 1:
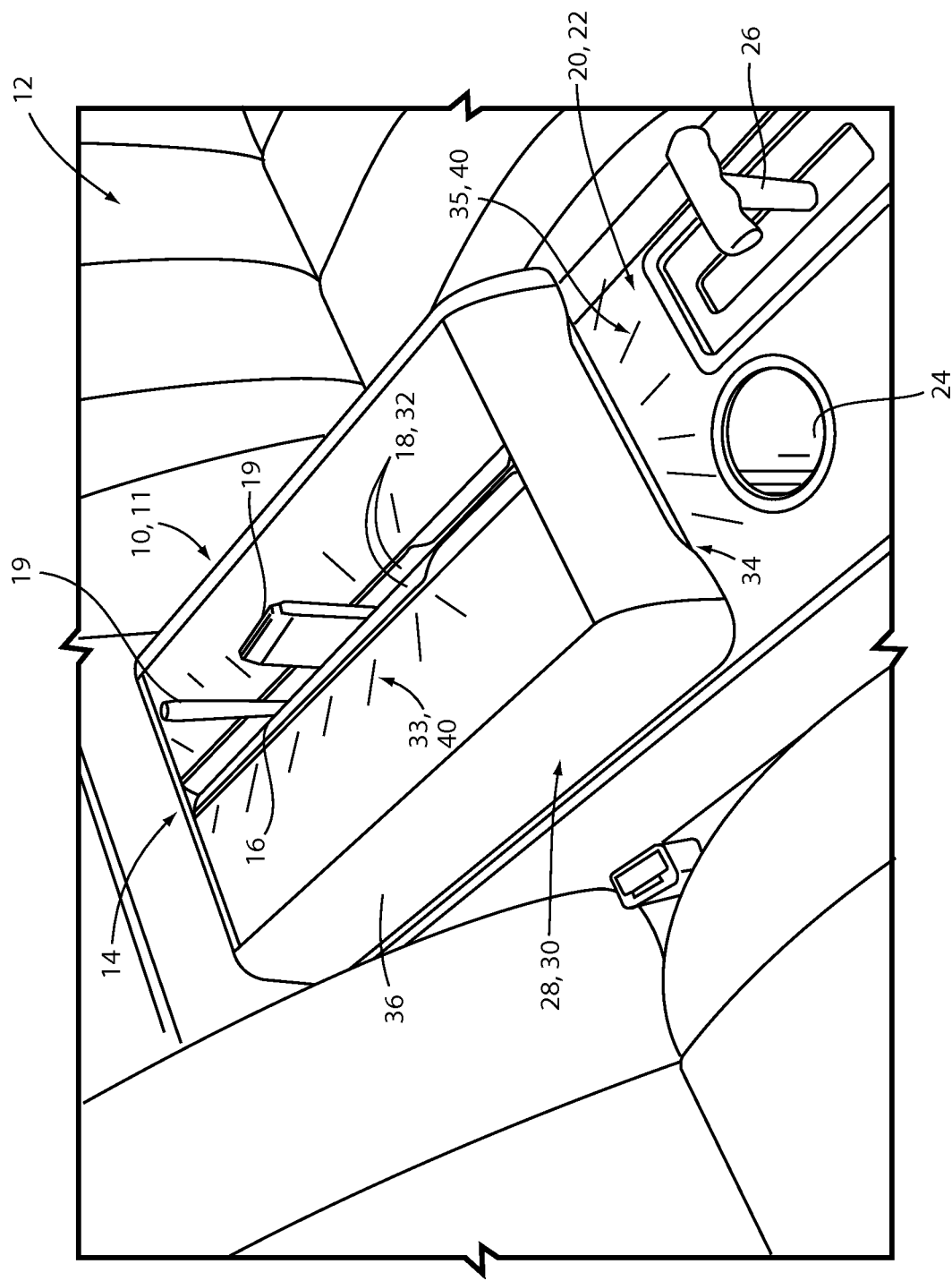
FIG. 1 is a perspective view of a passenger compartment of an automotive vehicle demonstrating a console comprising a lighting apparatus.

Referring to FIG. 1, a perspective view of a center console 10 is shown in a first position 11 located in a passenger compartment 12 of a vehicle. The console 10 may comprise a lighting apparatus 14 operable to provide lighting for a device holder 16. The lighting apparatus 14 may be disposed in the center console 10 and may be configured to illuminate at least one support member 18 of the device holder 16. The at least one support member 18 of the device holder 16 may be configured to provide a compressed fit for one or more devices 19 stored in the device holder 16.

In some implementations, the lighting apparatus 14 may also be configured to illuminate a surface 20 proximate the center console 10, which may correspond to a lower portion 22 of the center console 10. The lower portion 22 may correspond to a central panel comprising at least one cupholder 24, a gear lever 26, and a variety of additional vehicle devices and/or accessories. In this configuration, the lighting apparatus may be configured to illuminate the device holder 16 and the surface 20 proximate the center console 10.

Figure 5A:
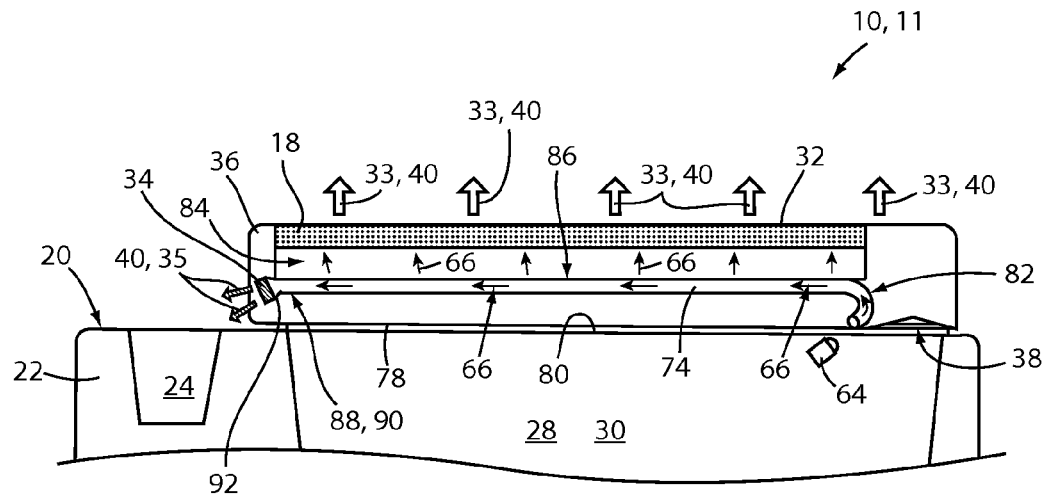
FIG. 5A is a side detail view of a console comprising a lighting apparatus arranged in a first position.
Figure 5B:
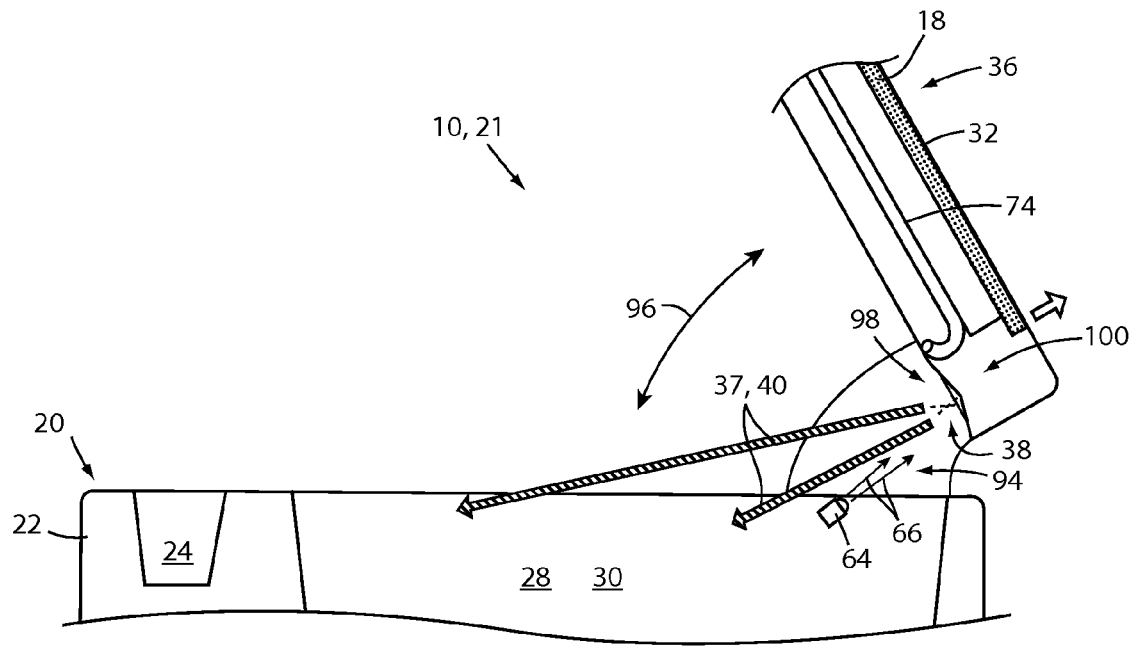
FIG. 5B is a side detail view of a console comprising a lighting apparatus arranged in a second position.

In a second position 21, as demonstrated in FIG. 5B, the console 10 may further be configured to illuminate at least a portion of an interior cavity 28 formed by the console 10. The interior cavity 28 may correspond to a storage bin 30 configured to provide storage space for various items. As described herein, the lighting apparatus 14 may provide for a cost effective apparatus configured to provide ambient light in the vehicle. The ambient lighting may be configured to emit wavelengths of light corresponding to one or more of a variety of colors. In this way, the center console 10 may be configured to beautify and improve the functionality of the passenger compartment 12.

The lighting apparatus 14 may comprise a light source disposed proximate the console 10. The light source is configured to emit a first emission or an excitation emission of light at a first wavelength. In the first position 11, light source may be configured to direct the first emission of light to a first photoluminescent portion 32. In response to receiving the first emission, the first photoluminescent portion 32 may be configured to illuminate the at least one support member 18 by outputting a second emission 33.

In some implementations, the lighting apparatus 14 may further illuminate a second photoluminescent portion 34 when the console 10 is oriented in the first position. The second photoluminescent portion 34 may be disposed proximate a fore region of the console 10. The lighting apparatus 14 may be configured to deliver the first emission to the second photoluminescent portion 34. In response to receiving the first emission, second photoluminescent portion 34 may become excited and emit a third emission 35. The third emission 35 may be configured to illuminate the surface 20 of the lower portion 22.

In the second position 21, the lighting apparatus 14 may be operable to illuminate at least a portion of the storage bin 30. A third photoluminescent portion 38 may be disposed proximate an interior surface of the upper portion 36 of the storage bin 30. As discussed in further detail in reference to FIG. 5B, the lighting apparatus 14 and the console 10 may be configured to direct the first emission toward the third photoluminescent 38 when the console 10 is oriented in the second position 21. In this configuration, the first emission may be emitted toward the third photoluminescent portion 38 such that a fourth emission 37 is emitted to illuminate at least a portion of the storage bin 30.

Each of the photoluminescent portions, for example the first photoluminescent portion 32, the second photoluminescent portion 34, and the third photoluminescent portion 38, may be configured to convert the first emission or an excitation emission having the first wavelength of the light to an output emission 40. The output emission 40 may refer to an emission output from a photoluminescent portion and may correspond one or more of the second emission 33, the third emission 35, and the fourth emission 37. The output emission 40 may comprise at least a second wavelength of the light having a longer wavelength than the first wavelength. As discussed herein, each of the photoluminescent portions 32, 34, and 36 may be configured to have various photochemical properties configured to convert the first emission at the first wavelength to the output emission or second emission 33. An output emission, as discussed herein may comprise a second wavelength and additional wavelengths (e.g. a third wavelength), which may include various combinations of wavelengths to emit light in various colors from each of the photoluminescent portions.

The first wavelength of the first emission or excitation emission may correspond to an emission of light having a violet or deep blue color. The first wavelength may have a peak wavelength of approximately less than 500 nm. The second wavelength, and other wavelengths, corresponding to output emissions 40, may comprise one or more wavelengths of light having at least one wavelength longer than the first wavelength. In some implementations, the output emissions 40 may correspond to a plurality of wavelengths that may appear as significantly white light. In such configurations, the light emitted from the light source at the first wavelength is configured to excite a photoluminescent portion as described herein. For example, in response receiving the first emission, the second photoluminescent portion 34 may emit a combination of wavelengths corresponding to a white colored light to illuminate at least a portion of the surface 20 of the lower portion 22 of the center console 10.

The light emitted from the light source at the first wavelength may correspond to a color of light that is less perceptible by the human eye in comparison to the wavelengths of the output emissions 40. This configuration may provide for the second emission 33, the third emission 35, and the fourth emission 37 to be activated by the light source, which may be projected from a single location. In this way, the lighting apparatus 14 may be configured to provide accent lighting to illuminate at least a portion of the console 10. By limiting the number of light sources required to provide the lighting discussed herein, the disclosure provides for a cost-effective apparatus for providing ambient lighting for a vehicle.

Figure 2A:
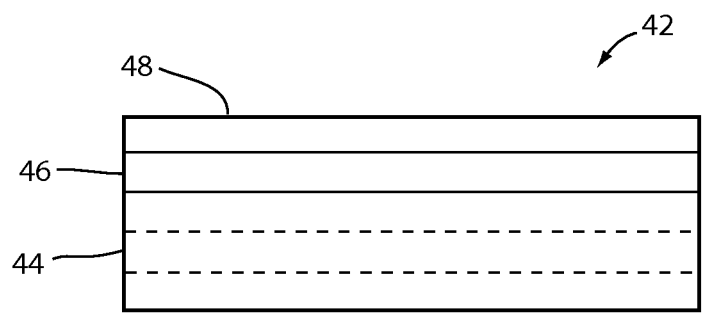
FIG. 2A illustrates a photoluminescent structure rendered as a coating.
Figure 2B:
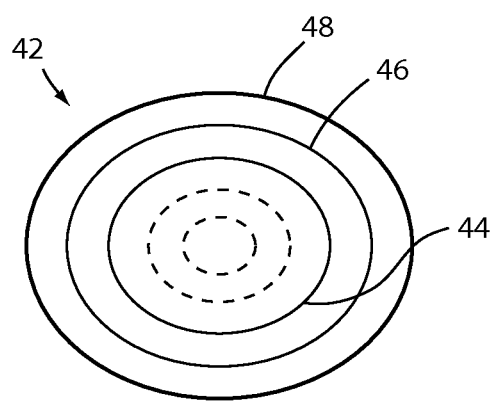
FIG. 2B illustrates the photoluminescent structure rendered as a discrete particle.
Figure 2C:
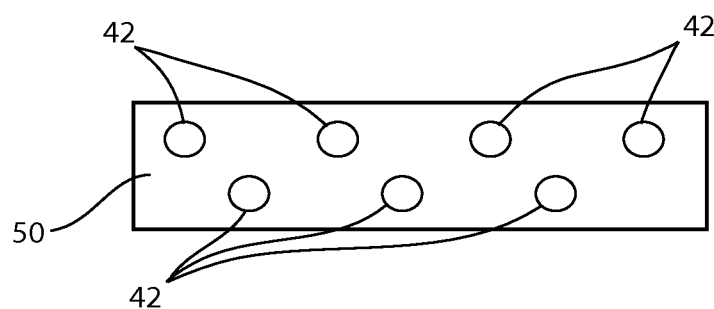
FIG. 2C illustrates a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a surface of the vehicle, a discrete particle capable of being implanted into a surface, and a plurality of discrete particles incorporated into a separate structure capable of being applied to a surface, respectively. As discussed herein, a surface of the vehicle may correspond to an at least partially light transmissive fabric, panel, and/or fixture operable to transmit the first emission therethrough. The photoluminescent structure 42 may correspond to the photoluminescent portions as discussed herein, for example the first photoluminescent portion 32, the second photoluminescent portion 34, and the third photoluminescent portion 38.

At the most basic level, the photoluminescent structure 42 includes an energy conversion layer 44 that may be provided as a single layer or a multilayer structure, as shown through broken lines in FIGS. 2A and 2B. The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle surface. The energy conversion layer 44 coating may be deposited on a vehicle surface by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a fabric, fixture, and/or panel of the vehicle. When the energy conversion layer 44 includes a multilayer formulation, each layer may be sequentially coated. Additionally, the layers can be separately prepared and later laminated or embossed together to form an integral layer. The layers may also be coextruded to prepare an integrated multi-layered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protection layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a desired surface of the vehicle.

In some implementations, the photoluminescent structure 42 may be incorporated into a fabric, fixture, and/or panel of the vehicle as one or more discrete multilayered particles as shown in FIG. 2C. The photoluminescent structure 42 may also be provided as one or more discrete multilayered particles dispersed in the polymer matrix 50 that is subsequently applied to a surface of the vehicle as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
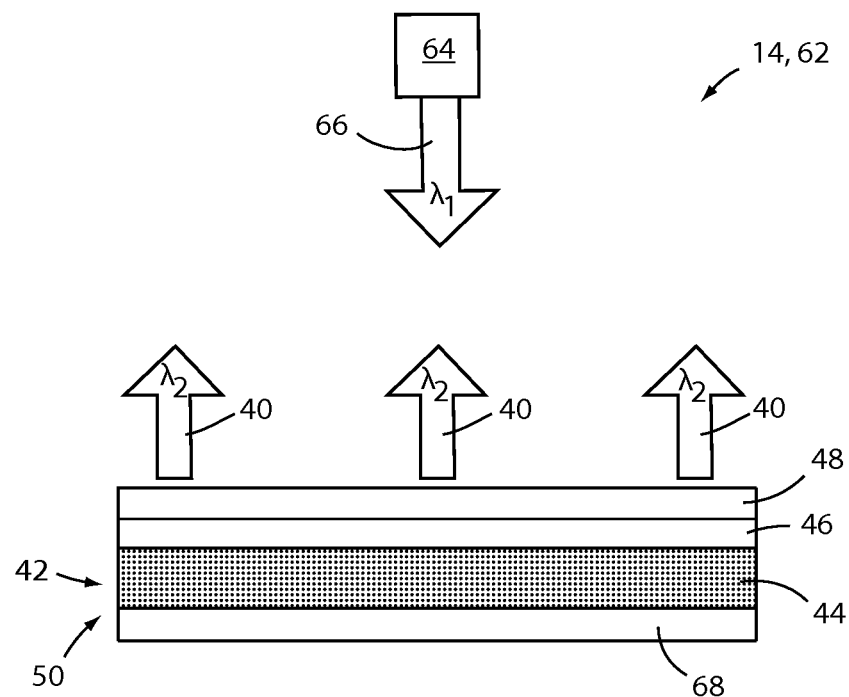
FIG. 3 is schematic view of a front-lit configuration of a lighting apparatus configured to convert a first wavelength of light to at least a second wavelength.

Referring to FIG. 3, the lighting apparatus 14 is generally shown according to a front-lit configuration 62. The front-lit configuration 62 may particularly correspond to a configuration operable to illuminate a portion the cavity 28 or storage bin 30 of the console 10. In this configuration, the light source 64 is configured to emit the first emission 66, which is converted to the output emission 40 by the energy conversion layer 44. The first emission 66 comprises a first wavelength $\lambda_1$, and the output emission 40 comprises at least a second wavelength $\lambda_2$. The lighting apparatus 14 comprises the photoluminescent structure 42 disposed on or in at least one photoluminescent portion (e.g. the third photoluminescent portion 38). The photoluminescent structure 42 may be rendered as a coating and/or dispersed in a material forming a surface 68 of the vehicle, for example an interior panel or portion of the console 10. The photoluminescent material may also be dispersed as the polymer matrix 50 corresponding to the energy conversion layer 44.

In some implementations, the energy conversion layer 44 may further include the stability layer 46 and/or protective layer 48. In response to the light source 64 being activated, the first emission 66 is received by the energy conversion layer 44 and converted from the first wavelength $\lambda_1$ to the output emission 40 having at least the second wavelength $\lambda_2$. The output emission 40 may comprise a plurality of wavelengths configured to emit any color of light from a photoluminescent portion as discussed herein. In this particular example, the output emission 40 may correspond to the fourth emission 37.

In various implementations, the lighting apparatus 14 comprises at least one photoluminescent material incorporated in the polymer matrix 50 and/or energy conversion layer 44 and is configured to convert the first emission 66 at the first wavelength $\lambda_1$ to the output emission 40 having at least the second wavelength $\lambda_2$. In order to generate the plurality of wavelengths, the energy conversion layer 44 may comprise one or more photoluminescent materials configured to emit the output emission 40 as wavelengths of light in the red, green, and/or blue color spectrums. Such photoluminescent materials may further be combined to generate a wide variety of colors of light for the output emission 40. For example, the red, green, and blue-emitting photoluminescent materials may be utilized in a variety of proportions and combinations to control the output color of the output emission 40.

Each of the photoluminescent materials may vary in output intensity, output wavelength, and peak absorption wavelengths based on a particular photochemical structure and combinations of photochemical structures utilized in the energy conversion layer 44. As an example, the output emission 40 may be changed by adjusting the wavelength of the first emission $\lambda_1$ to activate the photoluminescent materials at different intensities to alter the color of the output emission 40. In addition to, or alternatively to the red, green, and blue-emitting photoluminescent materials, other photoluminescent materials may be utilized alone and in various combinations to generate the output emission 40 in a wide variety of colors. In this way, the lighting apparatus 14 may be configured for a variety of applications to provide a desired lighting color and effect for a vehicle.

To achieve the various colors and combinations of photoluminescent materials described herein, the lighting apparatus 14 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The light source 64 may also be referred to as an excitation source and is operable to emit at least the first emission 66. The light source 64 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 66. The first emission 66 from the light source 64 may be configured such that the first wavelength $\lambda_1$ corresponds to at least one absorption wavelength of the one or more photoluminescent materials of the energy conversion layer 44 and/or polymer matrix 50. In response to receiving the light at the first wavelength $\lambda_1$, the energy conversion layer 44 may be excited and output the one or more output wavelengths, for example, the second emission having the second wavelength $\lambda_2$. The first emission 66 may provide an excitation source for the energy conversion layer 44 by targeting absorption wavelengths of a particular photoluminescent material or combination thereof. In this way, the lighting apparatus 14 may be configured to output the output emission 40 to generate a desired light intensity and color.

In an exemplary implementation, the light source 64 comprises an LED configured to emit the first wavelength $\lambda_1$ which may correspond to a blue spectral, violet, and/or ultraviolet color range. The blue spectral color range comprises a range of wavelengths generally expressed as blue light (~440-500 nm). In some implementations, the first wavelength $\lambda_1$ may comprise a wavelength in the ultraviolet and near ultraviolet color range (~100-450 nm). In an exemplary implementation, $\lambda_1$ may be approximately equal to 470 nm. Though particular wavelengths and ranges of wavelengths are discussed in reference to the first wavelength $\lambda_1$, the first wavelength $\lambda_1$ may generally be configured to excite any photoluminescent material.

In an exemplary implementation, the first wavelength $\lambda_1$ may be approximately less than 500 nm. The blue spectral color range and shorter wavelengths may be utilized as an excitation source for the lighting apparatus 14 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting apparatus 14 may be configured to create a visual effect of light originating from the photoluminescent structure 42 rather than the light source 64.

As discussed herein, each of the plurality of wavelengths corresponding to the output emission(s) 40 may correspond to a significantly different spectral color range. The second wavelength $\lambda_2$ may correspond to a plurality of wavelengths configured appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the each of the photoluminescent portions (e.g. the first photoluminescent portion 32, the second photoluminescent portion 34, and the third photoluminescent portion 38). Each of the output emissions 40 may utilize photoluminescent materials to output a color of light different from the first emission 66, and in some implementations, one or more of the output emissions may differ in color from one another.

Figure 4:
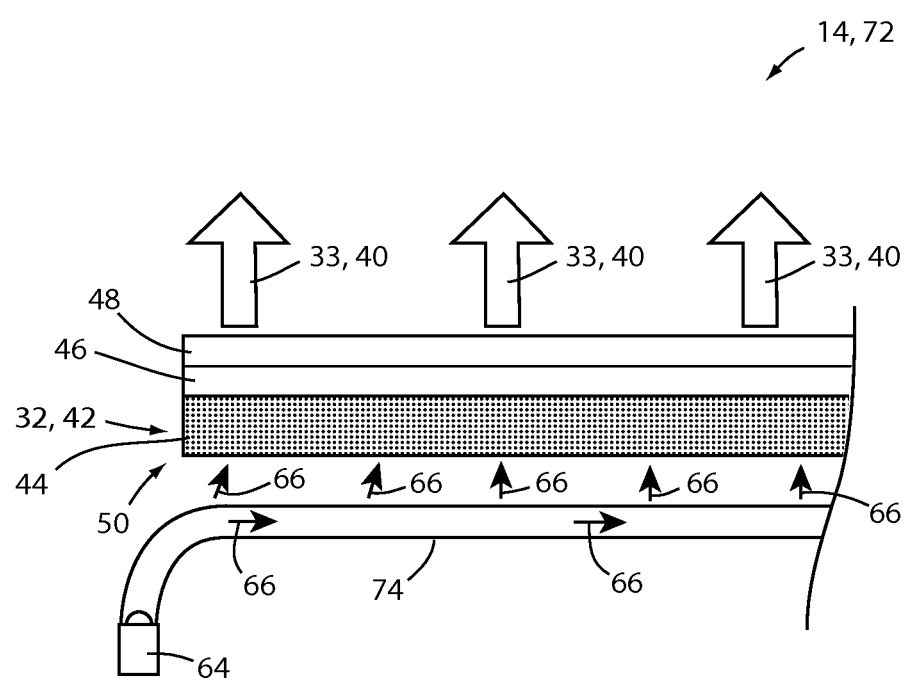
FIG. 4 is schematic view of a back-lit configuration of a lighting apparatus configured to convert a first wavelength of light to at least a second wavelength.

Referring to FIG. 4, the lighting apparatus 14 is generally shown according to a back-lit configuration 72 to convert the first emission 66 from the light source 64 to the output emission 40. The back-lit configuration may correspond to a configuration of the first photoluminescent portion 32 and/or the second photoluminescent portion 34. As such, the back-lit 72 configuration is discussed in reference to the first photoluminescent portion 32, which is configured to emit the second emission 33 in response to receiving the first emission 66.

In the back-lit configuration 72, the lighting apparatus 14 may comprise a light guide 74. The light guide 74 may be configured to channel the light at the first wavelength $\lambda_1$ substantially along the first photoluminescent portion 32. The light guide 74 may be of any material configured to transmit the light at the first wavelength $\lambda_1$ substantially along the extents of a first photoluminescent portion 32. In this example, the first photoluminescent portion 32 may correspond to at least a portion of the support member 18 having the first photoluminescent portion 32 disposed therein. In some implementations, the light guide 74 may comprise a polymeric material configured to provide a refractive index such that the light at the first wavelength $\lambda_1$ is transmitted consistently along the first photoluminescent portion 32.

The backlit configuration may comprise the energy conversion layer 44 and/or photoluminescent material dispersed in the polymer matrix 50 disposed on and/or dispersed in the support member 18 or any other portion of the vehicle. Similar to the energy conversion layer 44, demonstrated in reference to the front-lit configuration 62, the energy conversion layer 44 may be configured to be excited and output the one or more wavelengths in response to receiving the first emission 66. The one or more wavelengths of the second emission 33 may be configured to emit any color of light from the first photoluminescent portion 32 in response to the excitation of the energy conversion layer 44. The color of the light corresponding to the output emission 40 (e.g. the second emission 33) may be controlled by utilizing particular types and/or ratio of photoluminescent materials as discussed herein. Though the backlit configuration 72 is discussed in reference to the first photoluminescent portion 32, the second photoluminescent portion 34 may be configured similarly.

Referring now to FIGS. 5A and 5B, detailed cross-sectional views are of the center console 10 are shown arranged in the first position 11 and the second position 21, respectively. The center console 10 may comprise an upper portion 36 and the lower portion 22. In the first position 11, a lower surface 78 of the upper portion 36 is configured to extend substantially parallel to the lower portion 22 along an upper surface 80. In this arrangement, the light source 64 may be substantially aligned with the light guide 74 such that a proximal end portion 82 of the light guide 74 receives the first emission 66. In this configuration, the lighting apparatus 14 may be configured to illuminate at least the first photoluminescent portion 32 corresponding to the at least one support member 18.

The first photoluminescent portion 32 may be disposed in and/or applied as a coating to the at least one support member 18. The support member 18 may be composed of material that is at least partially light transmissive. The support member 18 may also have a coating or material structure configured to deform to restrict the movement of devices stored in the device holder 16 (e.g. any light transmissive, rubberized material). In this way, the support member 18 may allow the first emission to pass through the at least partially light transmissive material such that the first photoluminescent portion 32 receives the first emission 66.

Referring to FIG. 5A, in the first position 11, the first emission 66 may be output from the light source 64 and transmitted through the light guide 74. The light guide 74 may be configured to transmit the first emission 66 and release a first portion 84 along a length of the support member 18. The first emission 66 may be received by the support member 18 and excite the first photoluminescent portion 32. The first photoluminescent portion 32 may be applied as a coating and/or disposed in the material of the support member 18. In this configuration, the first photoluminescent portion may receive the first emission 66 entering and passing through the at least partially light transmissive material of the support member 18. In response to receiving the first emission 66, the first photoluminescent portion 32 may become excited and emit the second emission 33 to illuminate the at least one support member 18 of the device holder 16.

An upper portion 36 of the light guide 74 may be configured to emit the first portion 84 of the first emission 66 substantially evenly along a length of the support member 18. The upper portion 36 may comprise at least one diverting feature configured to control a quantity of the first emission 66 that may escape through the upper portion 36. In this configuration, the first portion 84 of the first emission 66 may be substantially evenly distributed along the length of the support member 18. The diverting feature may comprise an etched, roughed and/or notched surface and/or a variety of additional features that may divert the first portion 82 of the first emission 66 upward from the light guide 74 to toward the support member 18.

The light guide 74 may also be configured to direct a second portion 88 of the first emission 64 through the light guide 74 to a distal end portion 90. Proximate the distal end portion 90, the first emission 66 may be delivered to the second photoluminescent portion 34 to illuminate the surface 20 proximate the center console 10. In this configuration, the lighting apparatus 14 may provide for ambient lighting of the device holder 16 and the surface 20 proximate the console 10.

The second portion 88 of the first emission 66 may correspond to a portion of the first emission 66, which is not outputted through the upper portion 36 and is transmitted through the light guide 74 to the distal end portion 90. The second portion 88 may be transmitted through the light guide 74 to an optic portion 92 configured to distribute the second portion 88 of the first emission 66 along the second photoluminescent portion 34. In response receiving the first emission 66, the second photoluminescent portion 34 may become excited and emit the third emission 35. In this way, the second photoluminescent portion 34 may emit the third emission 35 to illuminate the surface 20 proximate the console 10 in the back-lit configuration 72.

In some implementations, the second photoluminescent portion 34 may be disposed proximate the surface 20 of the lower portion 22 of the console 10 in a front-lit configuration 62. For example, the second portion 88 of the first emission 66 may be output from the distal end portion 90 of the light guide 74. The second photoluminescent portion 34 may be applied to and/or distributed within a material of the cupholder 24 or the surface 20. In this configuration, the second portion 88 of the first emission 66 may be received by the second photoluminescent portion 34. In response to receiving the second portion 88, the second photoluminescent portion 34 may become excited and emit the third emission 35. As such, the lighting apparatus 14 may be configured to illuminate the second photoluminescent portion in a front-lit configuration 62 emitted from the cupholder 24 or the surface.

Referring to FIG. 5B, in the second position 21, the upper portion 36 of the console 10 may be arranged such that the cavity 28 or storage bin 30 is accessible to a passenger of the vehicle. In the second position 21, the upper portion 36 of the console 10 may be rotated about a hinged portion 94 such that the upper portion 36 extends away from the lower portion 22 at an angle 96 about the hinged portion 94. In this configuration, the first emission 66 may be output from the light source 64 through a volumetric space 98 formed between the upper portion 36 and the lower portion 22 and directed toward the third photoluminescent portion 38. Upon receiving the first emission 66, the third photoluminescent portion 38 may become excited and emit the fourth emission 37 to illuminate at least a portion of the cavity 28 or storage bin 30.

The third photoluminescent portion 38 is disposed proximate the lower surface 78 of the upper portion 36 of the center counsel 10. In this advantageous configuration, the angle 96 formed between the upper portion 36 and the lower portion 22, when the console is arranged in a second position 21, may correspond to a complementary angle of the first emission 66 emit from the light source 64. For example, if the angle 96 formed between the upper portion 36 and a lower portion 22 when accessing the storage bin 30 is approximately 70 to 100 degrees, the light source 64 may be configured to direct the first emission 66 approximately toward a corresponding location of the third photoluminescent portion 38. Additionally, the third photoluminescent portion 38 may be arranged in an angled configuration 100 relative to the upper portion 36 such that the direction of the fourth emission 37 is substantially directed toward the cavity 28 or storage bin 30. In this configuration, the lighting apparatus 14 may be further operable to illuminate cavity 28 formed by the center console 10.

Figure 6:
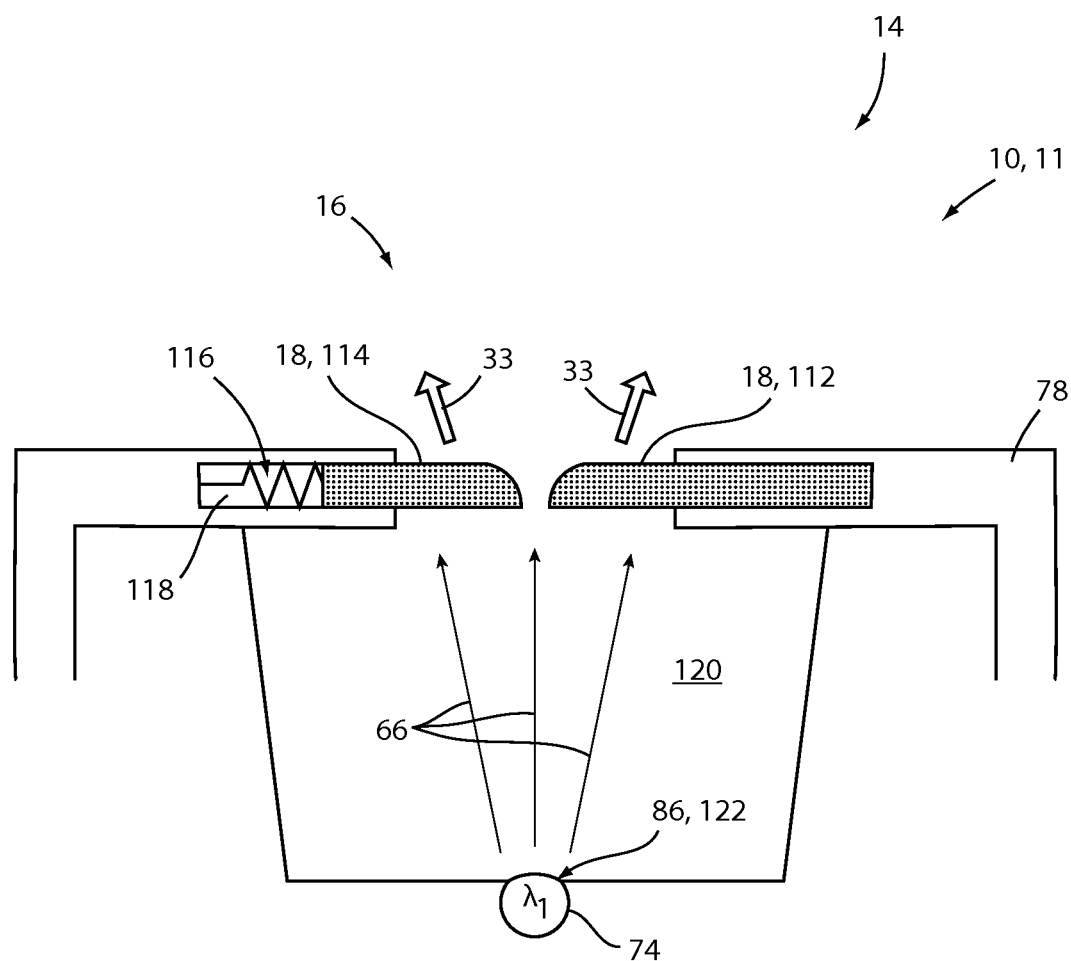
FIG. 6 is a cross-sectional view of a device holder configured to be illuminated by a lighting apparatus in accordance with the disclosure.

Referring now to FIG. 6, a detailed front, cross-sectional view of the device holder 16 disposed in the upper portion 36 of the console 10 is shown. As discussed herein, the device holder 16 may comprise at least one support member 18. In an exemplary implementation, the device holder 16 may comprise a first support member 112 and a second support member 114. At least one of the first support member 112 and the second support member 114 may be configured to engage a device (e.g. a smart phone) via a spring-loaded assembly 116. The spring loaded assembly 116 may comprise a spring in connection with the second support member 114. The spring loaded assembly 116 may be disposed in a pocket 118 disposed in the upper portion 36. In this configuration, the second support member 114 may provide for a device to compress the spring loaded assembly 116 such that the device may enter a cavity 120 formed by the upper portion 36. In this way, the device holder 16 may be operable to engage the device (e.g. the device 19) between the first support member 112 and the second support member 114 to secure and store the device.

FIG. 6 may correspond to a view of the upper portion 36 of the console corresponding to the first position 11. In this configuration, the first portion 84 of the first emission 66 comprising the first wavelength $\lambda_1$ may be emitted from the upper portion 36 via the at least one light diverting feature 122. The first portion 84 of the first emission 66 may be directed from the upper portion 36 to the first support member 112 and the second support member 114. In response receiving the first emission 66, the first photoluminescent portion 32 may become excited and emit the second emission 33. In this configuration, the lighting apparatus 14 may provide for decorative ambient lighting that may appear to surround a device disposed between the support members 112 and 114 and demonstrate a location of the device holder 16.

As discussed herein, the first photoluminescent portion 32 may be applied as a coating and/or disposed in the material of the at least one support member 18. The at least one support member 18 may be composed of a variety of materials that may be configured to secure the device 19 in the device holder 16. For example, the at least one support member 18 may correspond to a material that may deflect slightly to increase effective surface area of contact between the at least one support member 18 and the device 19. Such a material may include various polymeric materials and coatings thereof that may be applied to a variety of structural materials. The at least one of the support member 18 and/or a coating applied thereto may correspond to at least partially light transmissive material that may have photoluminescent material corresponding to the first photoluminescent portion 32 disposed therein and/or applied as a coating thereto. In this configuration, the first photoluminescent portion may receive the first emission 66 entering and passing through the at least partially light transmissive material of the support member 18 to illuminate the at least one support member 18 of the device holder 16.

The lighting apparatus as described herein may provide various benefits including a cost-effective system operable to provide attractive ambient lighting for a vehicle. The various implementations described herein including the particular locations and configurations of each of the photoluminescent portions may vary without departing from the spirit of the disclosure. The subject matter of the instant disclosure provides for a lighting apparatus that may provide for ambient lighting for vehicles in a variety of colors that may be adjusted to suit a desired color scheme for the vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A photoluminescent device storage apparatus for a vehicle comprising:
    a console comprising an elongated opening forming a cavity;
    a pair of support members forming a first photoluminescent portion extending along opposing sides of a top of the elongated opening and configured to engage a device therebetween; and
    a light source disposed proximate the cavity and configured to emit a first emission of light upward to illuminate the photoluminescent portion in a second emission.

2. The storage apparatus according to claim 1, further comprising a light guide extending from the light source through the cavity.

3. The storage apparatus according to claim 2, wherein the light guide is configured to transmit the first emission from the light source and disperse the first emission in the cavity.

4. The storage apparatus according to claim 3, wherein the first emission passes through a volumetric space of the cavity to the first photoluminescent portion to illuminate the pair of support members in a second emission.

5. The storage apparatus according to claim 3, wherein the first emission is dispersed substantially uniformly throughout the cavity.

6. The storage apparatus according to claim 2, further comprising a second photoluminescent portion disposed proximate a fore region of the console.

7. The storage apparatus according to claim 6, wherein the light guide comprises a proximal end portion configured to receive the first emission from the light source and transmit a portion of the first emission to a distal end portion of the light guide proximate the second photoluminescent portion.

8. The storage apparatus according to claim 7, wherein the portion of the first emission is converted to a third emission emitted toward a stationary portion of the console.

9. A photoluminescent storage apparatus for a vehicle comprising:
    a console comprising:
        a lower portion; and
        an upper portion operable to rotate from a first position to a second position;
    a light source disposed proximate the lower portion configured to emit a first emission of light; and
    a first photoluminescent portion and a second photoluminescent, wherein first emission is directed to the first photoluminescent portion in the first position and the second photoluminescent in the second position.

10. The storage apparatus according to claim 9, wherein the upper portion is operable to rotate relative to the lower portion from the first position to the second position.

11. The storage apparatus according to claim 9, wherein the upper portion forms an elongated opening and a cavity, the first photoluminescent portion is proximate the opening.

12. The storage apparatus according to claim 11, wherein in the first position, the first emission is transmitted through a light guide disposed in the upper portion and configured to emit the first emission in the cavity to illuminate the first photoluminescent portion in a second emission.

13. The storage apparatus according to claim 12, wherein in the second position, the first emission is directed toward a pocket of the upper portion comprising the second photoluminescent portion, wherein the second photoluminescent portion emits a third emission in response to receiving the first emission to illuminate the lower portion.

* * * * *